G. E. FRANQUIST.
PISTON.
APPLICATION FILED AUG. 1, 1914.

1,153,902.

Patented Sept. 21, 1915.

Witnesses:

Inventor
Gustave E. Franquist.
By his Attorneys
Rosenbaum, Stockbridge & Borst

UNITED STATES PATENT OFFICE.

GUSTAVE E. FRANQUIST, OF NEW BRUNSWICK, NEW JERSEY.

PISTON.

1,153,902.  Specification of Letters Patent.  Patented Sept. 21, 1915.

Application filed August 1, 1914. Serial No. 854,484.

*To all whom it may concern:*

Be it known that I, GUSTAVE E. FRANQUIST, a citizen of the United States, residing at New Brunswick, in the county of Middlesex and State of New Jersey, have invented certain new and useful Improvements in Pistons, of which the following is a full, clear, and exact description.

This invention relates to internal combustion engines and has for its primary object the provision of a piston which will eliminate the piston clatter at all speeds and temperatures of the motor.

With this object in view, the invention consists of a piston having a sleeve which is circumferentially compressible and is adapted to have a snug sliding fit in the cylinder when cold, so that upon an expansion of the piston its sleeve will automatically yield sufficiently to prevent the piston from sticking in the cylinder, and after the cylinder has also expanded will again automatically resume substantially its normal size and take up the free play between the cylinder and piston, which would otherwise occur.

The invention also consists of the constructions which will be hereafter described in detail and particularly pointed out in the appended claims.

Figure 1:
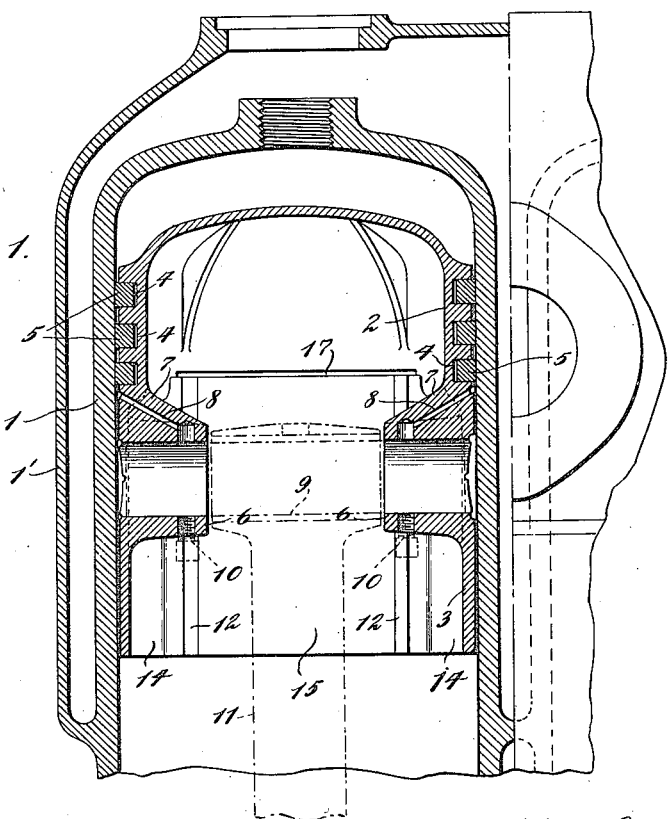
Figure 2:
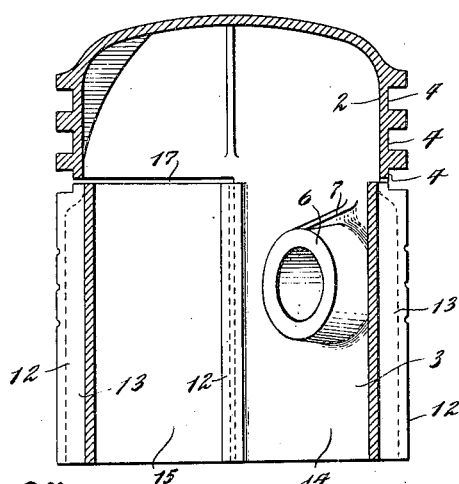
Figure 3:
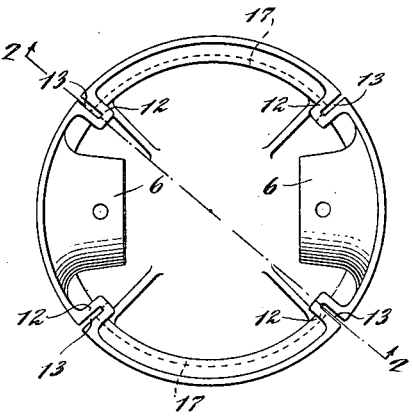

In the accompanying drawings Figure 1 shows a central longitudinal section through a cylinder and a piston constructed in accordance with the principles of this invention; Fig. 2 is a central longitudinal section of the piston on the line 2—2 shown in Fig. 3; and Fig. 3 is a bottom plan.

Referring to the drawings, 1 designates broadly the cylinder and 1' the water jacket of an internal combustion engine, the particular construction of which forms no part of the present invention. The piston shown may be regarded as comprising two parts, a head 2 and a sleeve 3, the head extending rearwardly to the rear end of the rearmost piston ring, while the remaining portion of the piston constitutes the sleeve. The head of the piston is provided with circumferential grooves 4 in which the piston rings 5 are adapted to be loosely fitted. Extending inwardly from the inner peripheral surface of the sleeve at diametrically opposed points are the piston pin bosses 6. These bosses are provided with ribs 7 through which an oil groove or hole 8 is bored in order to supply the lubricating material to a crank pin 9, which is suitably fitted in journals provided in these bosses, and is held in place therein by set screws 10. The pin 9 carries a connecting rod 11, the construction thus far described being typical of the ordinary hollow "trunk" piston.

As is the usual practice, the circumferential surface of the head of the piston, or that portion which lies between the piston rings, is machined so as to fit very loosely within the cylinder to permit an expansion of the piston when heated, and is usually from .010 to .020 of an inch less in diameter than the diameter of the cylinder. The piston rings are also fitted in the grooves to allow them to have some lateral movement. The head of the piston does not therefore serve to prevent the piston from rattling within the cylinder. It is necessary then to depend upon the sleeve of the piston to prevent the rattling or clapping of the piston within the cylinder and heretofore it has been customary to allow .002 to .005 free play between the sleeve of the piston and the cylinder to take care of the expansion of the piston before the cylinder walls become heated and to prevent the piston from sticking. After the engine has been running for a comparatively long period the cylinder walls expand, since the water in the jacket becomes heated and the same necessity for compensating for the expansion of the piston does not arise. When the sleeve fits as loosely as this within the cylinder, the piston will set up a rattling and clapping in the cylinder while it remains comparatively cool, *i. e.*, while the motor is picking up, and against after the cylinder has expanded so that the noise resulting therefrom may be heard by the driver and occupants of the car, if the internal combustion engine is used on an automobile. In order to prevent this rattling, it is proposed to use a piston having a sleeve which is circumferentially compressible so that it may be fitted snugly to the cylinder when cold and will automatically take care of the expansion of the piston. One embodiment of such a construction is shown in the drawings and will now be described. Projecting inwardly from the inner surface of the sleeve are longitudinal ribs 12 which preferably extend the entire length of the sleeve substantially parallel to the axis of the piston to a point on a level with the middle of the rearmost piston ring. Longitudinal slots 13 are cut in the outer surface of the sleeve and extend into these ribs, forming the longitudinal grooves in the same. These slots divide the sleeve of the piston into longitudinal sections 14—14 and 15—15, the sections 14—14 carrying the piston pin bosses 6.

Circumferential slots 17—17 are cut in the outer surface of the sleeve in the sections 15—15 respectively, which slots extend to and join the longitudinal slots of 13, separating the longitudinal sections 15 from the head of the piston. The sections 14—14 which carry the piston pin bosses remain integrally connected to the piston head 2 and are relieved from a point on a level with the rearmost piston ring to a point below the piston pin bosses, approximately .005 of an inch on the side, to insure that upon the expansion of the piston the portion of the sleeve which carries the bosses will be prevented from sticking to the cylinder walls and causing either the motor to stop, or the breakage of the parts. In machining a piston of this character, the sleeve is given a relatively snug sliding fit within the cylinder even when cold; or in other words, the piston may be so accurately fitted to the cylinder that even when the piston is cold and the motor is starting there will be no rattling or undesirable noises produced by the actuation of the piston as the motor picks up and the temperature of the piston rises. Due to high temperature of the explosive gases the piston will commence to expand and the cylinder walls will therefore exert a pressure on the same which must be relieved in order to prevent the piston from sticking. It is obvious, however, that as the piston expands the longitudinal sections 15—15 which are separated from the head of the piston and the other portions of the sleeve, by the slots 13 and 17, will move inwardly under the pressure which is exerted on these sections by the cylinder walls until the slots 13 and 17 are closed. However, these slots are made sufficiently large to insure that this will not occur. The rear ends of the sections 14—14 will yield similarly to sections 15—15. It is obvious, then, that the only portions of the sleeve which cannot yield due to the pressure exerted by the cylinder walls on the expanding piston, are those portions of the sleeve opposite the piston pin bosses, and, as has already been stated, these portions of the sleeve are relieved .005 of an inch or more on the side so that there will be no liability of these portions of the sleeve sticking to the cylinder walls. The circumference of the piston will therefore be decreased the desired degree and the piston will operate within the cylinder without sticking, while maintaining a snug sliding fit therein which will prevent any rattling. After the motor has been running a comparatively long period of time the water in the jacket becomes heated and the cylinder expands, but any free play which would otherwise occur will be taken up by the sections of the sleeve which have been compressed resuming their normal position. Another advantage of a sleeve of this character is that in a multi-cylinder engine it is customary to connect one or more of the cylinders together, which, when the cylinders expand, will cause a distortion of the cylinders from a true circle in cross section. By making the sleeve compressible in the manner described, any distortion of the cylinder will cause one or more sections of the piston to yield and the sticking of the piston which has heretofore taken place will be obviated.

While I have shown a particular embodiment of my invention for constructing a piston which is adapted to be compressed circumferentially under the pressure which is exerted by the cylinder walls upon the sleeve of an expanding piston, yet it is not my intention to be limited to the particular construction shown, as the invention is capable of various modifications and it is my intention to cover broadly a piston having a sleeve which is adapted to be compressed circumferentially by the pressure exerted by the cylinder walls when the piston is expanding so that the piston will at all speeds and temperatures of the motor, have a snug sliding fit within the cylinder, which will prevent any rattling of the piston.

What I claim as new and desire to secure by Letters Patent, is:

1. In combination with the cylinder of an internal combustion engine, a piston comprising a head and a sleeve, said sleeve being automatically circumferentially compressible under the pressure exerted by the cylinder walls upon said sleeve when said piston expands.

2. In combination with a cylinder for an internal combustion engine, a piston comprising a head and a sleeve integral therewith, said sleeve being automatically compressible under the pressure exerted by the cylinder wall upon said sleeve when said piston expands.

3. A piston for internal combustion engines, having a head and a sleeve integral therewith, said piston having a circumferential slot therein separating a portion of said sleeve from said head and longitudinal grooves in said piston joining said circumferential slot, forming a section of said sleeve capable of bodily movement relative to the remainder of said sleeve.

4. A piston for internal combustion engines, comprising a head and a sleeve integral therewith, said piston having a circumferential slot therein dividing a portion of said sleeve from said head, longitudinal ribs formed on the inner peripheral surface of said sleeve, said ribs having longitudinal grooves therein, joining said circumferential slot.

5. A piston for internal combustion engines, comprising a head and a sleeve integral therewith, said piston having a circumferential slot therein on a level with the rearmost piston ring, and ribs on the interior surface of said sleeve extending from the bottom of said sleeve to said slot, said ribs having longitudinal grooves therein joining the ends of said circumferential slot.

6. A piston for internal combustion engines, having a head and a sleeve, said sleeve having a rib on its inner surface extending the entire length of said sleeve, said sleeve having a slot therein extending into said rib and forming a longitudinal groove therein.

7. In an internal combustion engine, a cylinder, a piston therein comprising a sleeve having a snug sliding fit in said cylinder at all temperatures of said piston.

8. In an internal combustion engine, a cylinder, a piston comprising a head and sleeve, said sleeve having the portions thereof whose peripheral surfaces are in sliding contact with the walls of said cylinder automatically circumferentially compressible under the pressure exerted by said cylinder walls upon said sleeve when said piston expands.

9. In an internal combustion engine, a cylinder, a piston comprising a head and a sleeve integral therewith, said sleeve having the portions thereof whose peripheral surfaces are in sliding contact with the walls of said cylinder automatically circumferentially compressible under the pressure exerted by the said cylinder walls upon said sleeve when said piston expands.

10. In an internal combustion engine, a cylinder, a piston comprising a head and a sleeve, piston pin bosses projecting from the interior of said sleeve at a point adjacent the head of the piston, said sleeve comprising longitudinal sections some of which are bodily movable inwardly under the pressure exerted by the walls of said cylinder upon the same as the piston expands, and others of which, which carry the piston bosses, having the portions thereof extending outwardly from the piston bosses toward the free end of the sleeve also bodily movable and having their surfaces opposite the piston bosses of reduced diameter so that these portions are not in sliding contact with the walls of the cylinder.

11. In an internal combustion engine, a cylinder, a piston therefor, a head and a sleeve integral therewith, piston pin bosses extending from the interior surface of said sleeve, said piston having a circumferential slot therein on a level with the rearmost piston rim, and ribs on the interior surface of said sleeve extending from the bottom of said sleeve to said slot, said rib having longitudinal grooves therein joining the ends of said circumferential slot, and the external surface of said sleeve being relieved opposite the piston pin bosses whereby said portions of the sleeve do not contact with the cylinder walls.

In witness whereof I subscribe my signature in the presence of two witnesses.

GUSTAVE E. FRANQUIST.

Witnesses:
WALDO M. CHAPIN,
JULE ZELENKO.